United States Patent
Suoknuuti et al.

(10) Patent No.: US 7,228,153 B2
(45) Date of Patent: *Jun. 5, 2007

(54) APPARATUS FOR PROVIDING INFORMATION SERVICES TO A TELECOMMUNICATION DEVICE USER

(75) Inventors: Marko Suoknuuti, Helsinki (FI); Heikki Rautila, Espoo (FI)

(73) Assignee: Nokia Corporation, Espoo (FI)

( * ) Notice: Subject to any disclaimer, the term of this patent is extended or adjusted under 35 U.S.C. 154(b) by 179 days.

This patent is subject to a terminal disclaimer.

(21) Appl. No.: 10/883,938

(22) Filed: Jul. 2, 2004

(65) Prior Publication Data

US 2005/0003760 A1 Jan. 6, 2005

Related U.S. Application Data

(63) Continuation of application No. 09/450,200, filed on Nov. 29, 1999, now Pat. No. 6,760,601.

(51) Int. Cl.
*H04Q 7/20* (2006.01)

(52) U.S. Cl. ............... 455/557; 455/414.1; 455/556.1

(58) Field of Classification Search ............... 455/410, 455/411, 417, 422.1, 425, 426.1, 426.2, 435.1, 455/436, 437, 448, 554.1, 555, 554.2, 557, 455/66.1, 343; 370/352–357, 395.52
See application file for complete search history.

(56) References Cited

U.S. PATENT DOCUMENTS 5,796,394 A * 8/1998 Wicks et al. ............... 715/751
5,983,090 A * 11/1999 Aoki ......................... 455/403
5,983,098 A * 11/1999 Gerszberg et al. ....... 455/426.1
6,161,007 A * 12/2000 McCutcheon et al. ... 455/412.2
6,167,120 A * 12/2000 Kikinis .................... 379/90.01
6,434,402 B1 * 8/2002 Davison et al. ............ 455/555
6,512,755 B1 * 1/2003 Deschaine et al. ......... 370/338

FOREIGN PATENT DOCUMENTS

WO WO 99/46890 * 9/1999

OTHER PUBLICATIONS

Jaap Haartsen; "BlueTooth- The universal radio interface for ad hoc, wireless connectivity", Ericsson Review No. 3, 1998, pp. 110, no month listed.

* cited by examiner

*Primary Examiner*—Jean Gelin
(74) *Attorney, Agent, or Firm*—Banner & Witcoff, Ltd.

(57) ABSTRACT

An apparatus for providing information services to a user includes a microserver disposed at the user's home or office. The microserver is connected to a communication network which is connected to a global computer network, and the user's mobile or fixed telephone terminal. At least one service server is connected to the user's mobile or fixed terminal via the global computer network, the communication network and the microserver. Through the disposition of microserver at the user's primary location, the service server can transmit general or user specific service information to the user via their mobile and/or fixed terminal. The problems of localization of the user are eliminated by the implementation of the microsever at the user's primary communication location.

44 Claims, 2 Drawing Sheets

APPARATUS FOR PROVIDING INFORMATION SERVICES TO A TELECOMMUNICATION DEVICE USER

CROSS-REFERENCE TO RELATED APPLICATIONS

The present invention is a Continuation of U.S. application Ser. No. 09/450,200, filed Nov. 29, 1999, which issued as U.S. Pat. No. 6,760,601, the entire contents of which are incorporated herein by express reference. Priority is claimed on that application.

BACKGROUND OF THE INVENTION

1. Field of the Invention

The present invention relates to communication systems, and more particularly, to an apparatus for providing information/data services to a telecommunication device user from data networks.

2. Description of the Related Art

European Patent No. 0797368 discloses a telecommunication system and radio base station and portable telecommunication terminal thereof. In that system, information is stored in the base station (i.e., cells), which determines the minimum localization range of the portable/mobile telephone. Generally, in any given case, this range is equivalent to the cell size, and in some instances may be as large as 35 sq. km. Thus, it is clear that user localization is somewhat indeterminable, which results in the inability to use or even provide services to a mobile terminal user that require precise location information. Only when a call is placed to the mobile terminal can the stored information be transmitted to the mobile terminal from the base station. The information storage in this system is limited to the telecommunication operator's telecommunication network, thereby resulting in a limitation on the ability to provide additional services to the mobile terminal user. In addition, the inability to accurately locate the mobile terminal coupled with the fact that there is no connection between data networks and the communication network prevents the direct sending of data services to the mobile terminal user.

PCT Patent Publication No. WO 98/36585 discloses a sponsored call and cell service that suffers from the same previously mentioned localization and information storage problems, and lack of connection to data networks to enable it to provide data services to the end user/subscriber. In accordance with the disclosed system, subscriber location is determined when the subscriber makes an outgoing call. This, however, results in a determination as to the cell location of the mobile user and does not provide any more accurate localization of the user. As mentioned previously, the cell size can be up to 35 sq. km.

SUMMARY OF THE INVENTION

It is therefore an object of the present invention to provide an apparatus that enables more accurate localization of a user's location and thereby enable services to be provided to the user via his telecommunication terminal without requiring the user to make an outgoing call in order to receive such services.

A further object of the present invention is to provide an apparatus for providing information/data services to a telecommunication device user where a connection exists between the data networks providing the services and the communication network to which the user is connected.

It is yet another object of the present invention to provide an apparatus that is capable of storing service data intended for a particular user provided from a service provider in a device that is not part of the user's mobile telephone network (i.e., base station, MSC, etc.).

In accordance with a preferred embodiment, the apparatus of the present invention includes at least one service provider having a service server connected to a global computer network, such as, for example the internet. A public switching telephone network is connected to the global computer network and provides a connection to the user's home or office location. An interface device, such as a microserver, is connected to the public switching telephone network at the user's home or office and to the user's wireless mobile terminal and/or their wired fixed terminal.

Once the interface device is connected as described, the service provider can send service information to the user which is received and stored in the interface device. The interface device provides the stored information to the user at a user set appropriate time, such as, for example, before or during a user call, or when the user activates the mobile telephone or fixed telephone to make an outgoing or receive an incoming call.

The interface device is provided with a wireless communication protocol, such as bluetooth, to enable the wireless transmission of the received service information to the user's wireless terminal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements throughout the several views.

DETAILED DESCRIPTION OF THE PRESENTLY PREFERRED EMBODIMENTS

Figure 1:
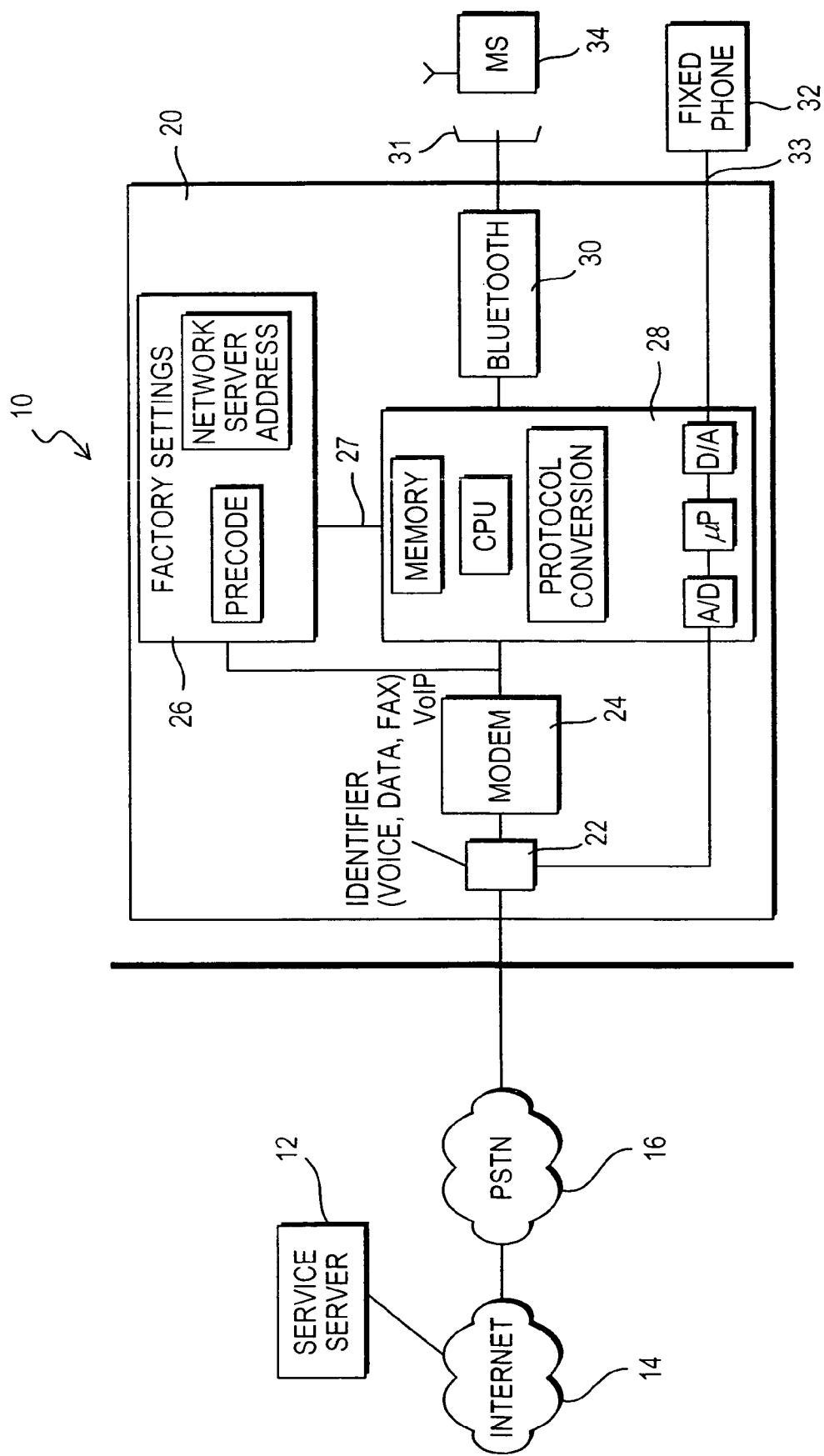
FIG. 1 is a block diagram of the communication system architecture in accordance with a preferred embodiment of the present invention.

FIG. 1 shows a preferred embodiment of the system 10 according to the present invention. A service server 12 is connected to the internet 14, or other global computer network, via a communication connection, such as for example, telephone lines, fiber optic cables, a wireless communication system, or any other suitable known communication connection. The service server 12 can be a storage device for a particular service provider, or a database of various services which can be delivered to the end user. The service server 12 is connected to the end user's mobile station/terminal (MS) 34 or fixed telephone 32 via the internet 14, a public switching telephone network (PSTN) 16 and a microserver 20. Microserver 20 includes a connection jack 33 for connecting fixed telephone 32 thereto. In a preferred embodiment, microserver 20 is physically located at the place where the user actually uses his telecommunication equipment (e.g., home or office). Examples of contemplated user telecommunication equipment can be a fixed or wired phone, a portal phone, or a wireless mobile phone.

In accordance with this embodiment, microserver 20 is connected to the PSTN at the user's home or office via a standard telecommunication connection, such as, for example, an RJ-45 connector, a T-base connector, fiber optics, integrated services digital network (ISDN), asymmetric digital subscriber line (ADSL) or any other known type of fixed telecommunication connection. Many other types of telecommunication connections may be employed. The microserver 20 may comprise a portable device which the user can use the standard telecommunication connection to connect to the PSTN at a current location of the user.

In one preferred embodiment, microserver 20 is a service provider specific item that is provided to the user from the service provider (e.g., a retailer such as a shopping mall or particular vendor). The user is generally a preferred client of the service provider supplying microserver 20 to the user. Upon connection of microserver 20 to the user's home or office PSTN and respective MS 34 or fixed phone 32, the retailer may provide the user with daily, weekly, monthly or even annual information relating to that particular retailer. Optionally, the user may also be able to receive additional benefits from the retailer or service provider by participating in a microserver program.

Once microserver 20 is connected to the user's home or office, it automatically contacts the service server 12 to initiate a handshake procedure (i.e., a registration process). Upon successful completion of the handshake, service server 12 registers that microserver 20 is online and ready to receive services (e.g., advertisements, information or other functions). The registration information exchanged during this procedure includes information as to the location of microserver 20 and may also include information relating to the user such as the user's personal preference from a retail, communication, recreational or other desired perspective. By installing microserver 20 in the user's home or office, the localization problems associated with mobile telephones are eliminated and accurate location information is available. The service server 12 also sends an acknowledgment signal to the microserver 20 via the internet 14 and PSTN 16 to confirm the automatic contact. Microserver 20 transfers or routes phone calls from the user's telecommunication equipment (e.g., MS 34 or fixed phone 32) to the PSTN 16 and internet 14. This call can also be an IP call as opposed to a voice call.

The service server 12 is configured to send data to microserver 20 that is to be viewed using the MS 34. In this case, MS 34 can be a wireless application protocol (WAP), general packet radio service (GPRS) or wideband code division multiple access (WCDMA) phone/terminal. The information sent from service server 12 to microserver 20 can be, for example, text or video data to be displayed and viewed on the user's telecommunication device, or voice messages/data to be listened to by the user when using fixed phone 32 or MS 34. In a preferred embodiment, microserver 20 stores the information sent from service server 12 in a memory such as, for example, a random access memory (RAM), and provides the information to the user via their MS 34 or fixed phone 32. Since the service information can be stored in microserver 20, the user may be provided with several options as to when the service information is conveyed to the user. An example of such options is a "do not disturb" mode that is activated, for example, with the dual tone multiple frequency (DTMF) keys and which would disable the transmission of service information from the microserver 20 to the user's MS 34 or fixed phone 32 until deactivated. Once the "do not disturb" mode is deactivated, microserver 20 provides the stored service information to the user. Another example of such an option could be enabling the user to forward or send the received service information to a called party of the user's choice through the use of the DTMF keys, or even forward the received information to the user at another location, similar to call forwarding.

Alternatively, the information sent to MS 34 or fixed phone 32 may be advertisements, promotions or information services such as, for example, stock quotes, sports scores, etc., from companies doing business with the service server company or from the service server itself. The promotions can consist of retailer promotions that provide the user with a retail benefit such as a coupon or code that the user can redeem at the promoting retailer's stores. Such promotions can be provided by the retailer with a time limit on the redemption period, so that if the user does not act on the specific promotion within an allotted period of time, the promotion opportunity to the user is lost. The type of information provided to the user is unlimited, and can be for business, personal and/or recreational purposes. In addition, the information sent to MS 34 or fixed phone 32 can be updated from previously sent information from the service server 12 when the service server company has updates to report to the users of the services.

Thus, in accordance with an embodiment of the present invention, the user will be notified as to the presence of received service information when it arrives. This notification can be audible or visual and can be performed, for example, prior to the user placing a call with the MS 34 or fixed phone 32, during a call and/or after a call has been completed. Once prompted as to the presence of the service information, the user can decide whether to review the information immediately or wait until a later time. In other contemplated embodiments, the service information may be transmitted in audio and/or video form to the user and potentially to a called party (by the user) during the call.

Microserver 20 includes an identifier 22 that is directly connected with the connection to PSTN 16. Identifier 22 receives and identifies an incoming signal as voice information, data information (modem), or fax information, and/or a telephone call from a third party, and routes the received signal to the proper device within microserver 20. When the incoming call is a data or fax signal, it is routed to modem 24 which performs protocol handshakes with the calling device and establishes a point-to-point protocol (PPP) connection between the service server 12 and central processing unit (CPU) card 28 of the microserver 20. In another contemplated embodiment, modem 24 is not required when microserver 20 is connected with an integrated services digital network (ISDN) or an asymmetric digital subscriber line (ADSL) network, or other full time connection to internet 14. In this embodiment, the ADSL, ISDN or other fixed connection takes the place of PSTN 16. CPU card 28 contains a main processor (CPU), upper layers of communication protocol stacks (e.g., PPP, TCP/IP, ALF), and a memory. In addition, CPU card 28 includes interception circuits such as A/D and D/A converters as well as a microprocessor that provide a normal mode bypass for voice calls but is capable of intercepting or interrupting the voice call when the CPU wants to transmit services to the user from the service server 12 during a voice call.

The factory setting module 26 is connected to the CPU card 28 via a control/program bus 27, and stores the permanent settings of the microserver 20, such as, for example, a startup code, a network server address, user specific information and identity and any other information deemed necessary for operation of the microserver. A bluetooth radio communication module is connected to CPU card 28 and provides a protocol for wireless communication between microserver 20 and mobile station/terminal 34.

In accordance with the preferred embodiment, bluetooth protocol is part of the implementation platform for using microserver 20 with a mobile/wireless terminal 34. As is known in the art, bluetooth is an open specification for wireless communication of data and voice. It provides a universal bridge to existing data networks, a peripheral interface, and a mechanism by which small private ad hoc groupings of connected devices away from fixed network infrastructures are formed. Bluetooth is based on a low-cost short-range radio link, built into a relatively small (e.g., 9 mm$^2$) microchip. The radio link is used to facilitate protected ad hoc connections for stationary and mobile environments.

Bluetooth radio links are designed to operate in a noisy radio frequency environment. Consequently, it uses a fast acknowledgement and frequency hopping scheme to form a robust link. Use of Forward Error Correction (FEC) limits the impact of random noise on long-distance links. The encoding schemes utilized by bluetooth are optimized for uncoordinated environments. Bluetooth radios operate in an unlicensed band at about 2.4 GHz. The nominal link range for a bluetooth radio is 10 centimeters to 10 meters; however, this range can be extended up to 100 meters by appropriate increase in the transmission power.

It is to be understood that bluetooth is disclosed herein as an exemplary implementation of microserver 20 with a wireless mobile terminal 34, and that other wireless specifications such as, for example, wireless local area networks (WLAN) and WAP can be used without departing from the scope of the present invention. WAP is used here as an example of application protocol that can be implemented into the present invention.

Figure 2:
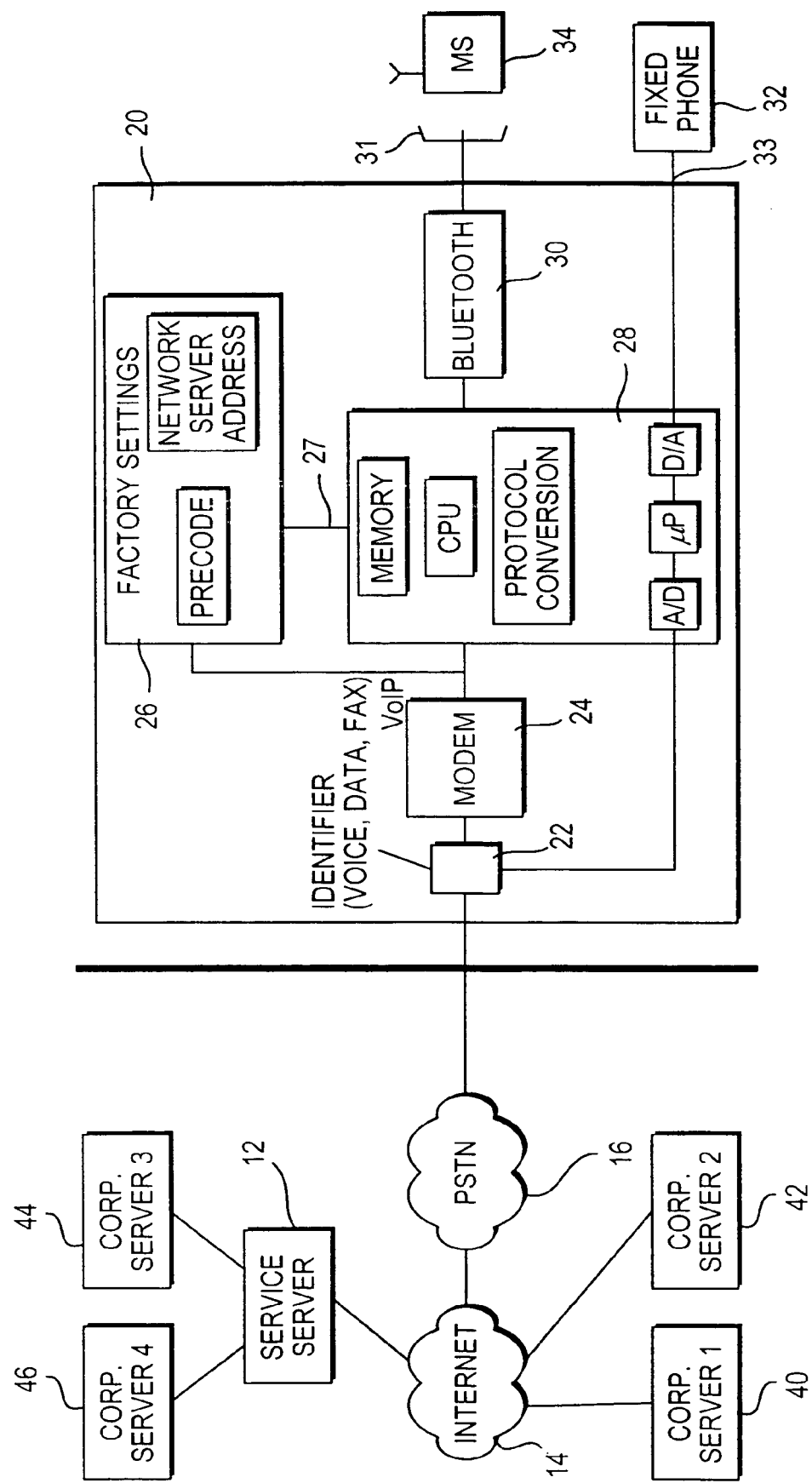
FIG. 2 is a block diagram of the communication system architecture according to an alternative embodiment of the invention.

FIG. 2 shows an alternative embodiment of the present invention where service server 12 has several corporate servers 44 and 46 connected thereto. Corporate servers 44 and 46 can be, for example, servers for corporations offering services to the end user. Examples of services provided by such corporate entities may be, fax services, email, voice mail, retailers offering products or promotional programs, recreational service providers, advertisements, etc.

In other contemplated embodiments, the corporate servers 40 and 42 can be connected directly to internet 14 and therefore would not require the intervention of service server 12. Corporate services 40 and 42 would operate as a service server by providing information services to the user via the internet 14, PSTN 16 and microserver 20.

In an exemplary operation, microserver 20 is installed by the user in their home or office, or other place in which they commonly use the telecommunication device connected to the microserver (e.g., MS 34 or fixed phone 32). Upon connection of the microserver 20 with the PSTN 16 and MS 34 or fixed phone 32, a power up operation begins where power up phase operation code is sent from the factory setting module 26 to the CPU card 28 via bus 27. CPU card 28 responds by starting up and placing a registration call to service server 12. Once the registration process is successfully completed and microserver 20 is running, microserver 20 can receive information from the service server 12 or other service or corporation servers. When the service server 12 (or corporate server connected directly to internet 14) has information to be loaded into a specific user's microserver, it will establish a data call to that microserver. As stated earlier, this information can be advertisements, email, news, short-message-system (SMS), voice mail, or any other data that can be transferred over a data connection. When microserver 20 receives a service call, it will automatically answer the call (based on the calling number) and establish the PPP data connection between the CPU card 28 and service server 12. Once connected, the service information from service server 12 will be delivered into the memory of the microserver. Upon completion of the loading, the microserver can notify the user that there are messages or information waiting for them by illuminating a light displaying a text message, providing an audible notification, or any combination of these indications. This notification can be a user settable option (e.g., the user can set microserver to either notify them upon receipt of the service information, or could instruct microserver to store the information until the user attempts to use the MS 34 or fixed phone 32.

The data from the service server 12 or corporate servers can be transferred to the microserver 12 at any time. In other contemplated embodiments, microserver 20 may, upon receipt of new service information, take over the phone line to which it is connected and send the stored messages directly to the user while they are currently using MS 34. In another embodiment, a wireless application protocol (WAP) is used as the delivery mechanism for delivering service information when the mobile device MS 34 is used as a terminal.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An apparatus for providing an interface to a communication network for a telecommunication device for a mobile user, the communication network having a plurality of connection points, the apparatus comprising a portable microserver including first connection means for establishing a communication connection to the communication network by any of the connection points, such that the portable microserver is movable to any of the connection points by the mobile user, and for automatically initiating communications between said portable microserver and a server of at least one service provider through the communication network, upon connection of the portable microserver to one of the connection points, an address of the server being stored by the portable microserver, and second connection means for establishing a communication connection with the telecommunication device of the mobile user, the portable microserver operable for interfacing with the communication network and transferring and routing communications between the communication network and the telecommunication device.

2. The apparatus of claim 1, wherein said second connection means establishes a short-range radio communication connection.

3. The apparatus of claim 2, wherein said second connection means establishes a Bluetooth connection.

4. The apparatus of claim 2, wherein said second connection means establishes a wireless local area network connection.

5. The apparatus of claim 1, wherein the server is connected in a data network which is connected to the communication network, said first connection means receiving services from said server and receiving phone calls to the mobile station through the communication connection to the communication network.

6. The apparatus of claim 5, wherein said microserver further comprises an identifier device connected to said first connection means, said identifier identifying an incoming signal received by said first connection means as one of a voice communication and a data communication.

7. The apparatus of claim 6, wherein said microserver includes a voice processor for processing voice communication, said identifier routing the voice communication to said voice processor for processing and said voice processor transmitting the voice communication to the telecommunication device by said second connection means.

8. The apparatus of claim 6, wherein said microserver includes a data processor for processing data communication, said identifier routing data communication to said data processor for processing and said data processor transmitting the data communication to the telecommunication device by said second connection means.

9. The apparatus of claim 1, wherein the communication network is an integrated services digital network.

10. The apparatus of claim 1, wherein the communication network is an asymmetric digital subscriber line.

11. The apparatus of claim 1, wherein the communication network is the internet.

12. The apparatus of claim 1, wherein the telecommunication device is a mobile phone.

13. The apparatus of claim 1, wherein said portable microserver is operable for providing telephone call communication between the telecommunication device and a remote device.

14. The apparatus of claim 13, wherein the remote device is coupled to one of the internet and a telecommunication network.

15. The apparatus of claim 13, wherein the telephone call communication is a voice over internet protocol call.

16. The apparatus of claim 1, wherein said means for automatically initiating communications includes means for contacting said at least one service provider to communicate registration information between said portable microserver and said at least one service provider and to register said portable microserver with said at least one service provider.

17. The apparatus of claim 16, wherein said registration information comprises information relating to a location of said portable microserver.

18. The apparatus of claim 16, wherein said portable microserver further comprises means for automatically receiving and storing service information from said at least one service provider, wherein said service information is based on said registration information, means for notifying the user of the presence of the received service information, and means for transmitting the service information from said at least one service provider to the user's telecommunication device via the global network of computers and the communication network.

19. The apparatus in accordance with claim 1, wherein said microserver further comprises a factory setting module for storing permanent settings of said microserver, said permanent setting comprising at least one selected from the group consisting of a startup code, a network service address and user information.

20. A method for transferring and routing communications between a communication network and a telecommunication device of a mobile user, comprising the steps of:
establishing a first communication connection between a portable microserver and the communication network by connecting the portable microserver to a connection point of the communication network at a current location of the mobile user and automatically initiating, by the microserver, communications between the portable microserver and a server of at least one service provider through the communication network, upon connection of the microserver to the connection point, an address of the server being stored by the portable microserver;
establishing a second communication connection between the portable microserver and the telecommunication device; and
transferring and routing, by the portable microserver, communications between the communication network and the telecommunication device.

21. The method of claim 20, wherein the second communication connection is a short-range radio communication connection.

22. The method of claim 21, wherein the second communication connection is a Bluetooth connection.

23. The method of claim 21, wherein the second communication connection is a wireless local area network connection.

24. The method of claim 20, wherein said step of transferring and routing comprises receiving services from said server and receiving phone calls to the mobile station through the communication connection to the communication network.

25. The method of claim 24, wherein said step of transferring and routing comprises identifying, by the portable microserver, an incoming signal received from the communication network as one of a voice communication and a data communication.

26. The method of claim 25, further comprising the step of processing voice communication in a voice processor and sending the processed voice communication to the telecommunication device.

27. The method of claim 25, further comprising the step of processing data communication in a data processor and sending the processed data communication to the telecommunication device.

28. The method of claim 20, wherein the communication network is an integrated services digital network.

29. The method of claim 20, wherein the communication network is an asymmetric digital subscriber line.

30. The method of claim 20, wherein the communication network is the internet.

31. The apparatus of claim 20, wherein the telecommunication device is a mobile phone.

32. The method of claim 20, wherein said step of transferring and routing communications comprises providing, by the portable microserver, telephone call communication between the telecommunication device and a remote device coupled to the communication network.

33. The method of claim 32, wherein the telephone call communication is a voice over internet protocol call.

34. The method of claim 20, wherein said step of automatically initiating communications includes contacting said at least one service provider to communicate registration information between the portable microserver and the at least one service provider and to register the portable microserver with the at least one service provider.

35. The method of claim 34, wherein the registration information comprises information relating to a location of the portable microserver.

36. The method of claim 34, further comprising the steps of:
   automatically receiving and storing, by the portable microserver, service information from the at least one service provider, wherein the service information is based on the registration information;
   notifying, by the portable microserver, the telecommunication device of the user of the presence of the received service information; and
   transmitting the service information from the at least one service provider to the user's telecommunication device via the global network of computers and the communication network.

37. A portable microserver comprising first connection means for establishing a communication connection to a communication network by any of a number of connection points and for automatically initiating communications between said portable microserver and a server of at least one service provider through the communication network, upon connection of the portable microserver to one of the connection points, an address of the server being stored by the portable microserver, and second connection means for establishing a communication connection with a telecommunication device of the mobile user, the portable microserver operable for interfacing with the communication network and transferring and routing communications between the communication network and the telecommunication device, said microserver comprises further an identifier for receiving and identifying incoming communications and identifying the incoming signal into at least voice communication or data communication and routing the received signal into another device within said microserver for processing and forwarding the incoming communications between the first connection means and the second communication means.

38. The microserver of 37, wherein said microserver comprises a voice processor for processing voice communication, said identifier routing the voice communication to said voice processor for processing and said voice processor transmitting the voice communication to the telecommunication device by said second connection means.

39. The microserver of 38, wherein the microserver provides telephone call communication between a mobile phone coupled with the microserver and a destination.

40. The microserver of 39, wherein said microserver transfers or routes phone calls from the user's telecommunication equipment to the PSTN 16 and internet 14.

41. The microserver of 40, wherein said telecommunication equipment consisting one of the following MS or fixed phone.

42. The microserver of 40, wherein the phone call is an IP call.

43. The microserver of 41, wherein said microserver being in short-range communication with the mobile station.

44. The microserver of claim 37, wherein the server is connected in a data network which is connected to the communication network, said first connection means receiving services from said server and receiving phone calls to the mobile station through the communication connection to the communication network.

* * * * *